United States Patent
Burdick et al.

(10) Patent No.: US 7,996,722 B2
(45) Date of Patent: Aug. 9, 2011

(54) METHOD FOR DEBUGGING A HANG CONDITION IN A PROCESS WITHOUT AFFECTING THE PROCESS STATE

(75) Inventors: Dean Joseph Burdick, Austin, TX (US); Basu Vaidyanathan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 267 days.

(21) Appl. No.: 12/348,079

(22) Filed: Jan. 2, 2009

(65) Prior Publication Data
US 2010/0174946 A1     Jul. 8, 2010

(51) Int. Cl.
 G06F 11/00     (2006.01)
(52) U.S. Cl. .......................................... 714/38.1
(58) Field of Classification Search .................. None
 See application file for complete search history.

(56) References Cited

U.S. PATENT DOCUMENTS

| | | | |
|---|---|---|---|
| 5,715,386 A * | 2/1998 | Fulton et al. | 714/38 |
| 5,748,882 A | 5/1998 | Huang | |
| 5,889,988 A * | 3/1999 | Held | 718/103 |
| 6,044,475 A * | 3/2000 | Chung et al. | 714/15 |
| 6,249,755 B1 | 6/2001 | Yemini et al. | |
| 6,418,542 B1 * | 7/2002 | Yeager | 714/38 |
| 6,745,321 B1 | 6/2004 | Floyd et al. | |
| 7,222,268 B2 | 5/2007 | Zaifman et al. | |
| 7,391,312 B2 * | 6/2008 | Murphy et al. | 340/500 |
| 7,516,361 B2 * | 4/2009 | Vick et al. | 714/15 |
| 7,793,153 B2 * | 9/2010 | Subhraveti | 714/35 |
| 2003/0046464 A1 * | 3/2003 | Murty et al. | 710/260 |
| 2004/0054861 A1 * | 3/2004 | Harres | 711/163 |
| 2004/0221271 A1 * | 11/2004 | Zeman et al. | 717/127 |
| 2005/0120273 A1 * | 6/2005 | Hudson et al. | 714/38 |
| 2005/0132376 A1 * | 6/2005 | Rodgers et al. | 718/100 |
| 2006/0200702 A1 * | 9/2006 | Canning et al. | 714/38 |
| 2007/0061791 A1 * | 3/2007 | Hartikainen | 717/148 |

(Continued)

OTHER PUBLICATIONS

Detlefs et al., "Simplify: A Theorem Prover for Program Checking", Journal of the ACM, vol. 52, No 3, May 2005, pp. 365-473.

(Continued)

*Primary Examiner* — Robert Beausoliel
*Assistant Examiner* — Neil Miles
(74) *Attorney, Agent, or Firm* — Yee & Associates, P.C.; Jill A. Poimboeuf

(57) ABSTRACT

Embodiments of the invention are associated with an application process that comprises multiple threads, wherein threads of the process are disposes to run on a data processing system, and each thread can have a user mode or a kernel mode machine state, or both, selectively, when it is running. An embodiment directed to a method comprises the steps of allocating a specified memory location for each of the threads, and responsive to a given thread entering a sleep state, selectively saving the kernel mode machine state of the given thread in the specified memory location for the given thread. The saved machine state comprises the state of the given thread immediately prior to the given thread entering the sleep state. In response to detecting a hang condition in the operation of the process, a debugger is attached to the process to access at least one of the saved user mode machine states. The method further includes analyzing information provided by the at least one accessed machine state to determine the cause of the hang condition, and restoring the original state upon detachment, so the debugger attachment is completely transparent to the target process.

6 Claims, 2 Drawing Sheets

U.S. PATENT DOCUMENTS

| | | | |
|---|---|---|---|
| 2008/0183930 A1* | 7/2008 | LaFrance-Linden | 710/260 |
| 2008/0295077 A1* | 11/2008 | Sengupta et al. | 717/124 |
| 2008/0307267 A1* | 12/2008 | Chandrasekaran | 714/38 |
| 2009/0164976 A1* | 6/2009 | Gritter et al. | 717/127 |
| 2010/0049955 A1* | 2/2010 | Moyer et al. | 712/227 |

OTHER PUBLICATIONS

Yang et al., "Clairvoyant: A Comprehensive Source-Level Debugger for Wireless Sensor Networks", 2007, ACM, SenSys'07 Nov. 2007 Sydney Australia, pp. 189-203.

* cited by examiner

METHOD FOR DEBUGGING A HANG CONDITION IN A PROCESS WITHOUT AFFECTING THE PROCESS STATE

BACKGROUND OF THE INVENTION

1. Field of the Invention

The invention disclosed herein generally pertains to a method for debugging, or determining the cause of, a hang condition that has been detected in an application process. More particularly, the invention pertains to a method of the above type wherein the state of a process thread can be recovered by the debugger, for use in determining the cause of the hang condition.

2. Description of the Related Art

When an application process that has multiple threads is running on a data processing system, a "hang" condition or "hang" can occur, wherein the process becomes frozen or deadlocked and is unable to continue. A hang can occur when one of the threads is sleeping or in a sleep state, as described hereinafter in further detail.

As is well known by those of skill in the art, a debugger is a computer program used to test and debug other programs. If a program crashes and the debugger is a source level type of debugger, if can be used to determine the position of a fault or defect in the original code. Accordingly, a source level debugger may serve as a useful tool for determining programming errors in processes of the above type, wherein the errors can result in hang conditions. However, currently available source level debuggers have a serious drawback.

A debugger as described above attaches to a thread of an already running process by sending a signal to the process, causing one of the threads in the process to change its execution path to handle the signal. This thread will then recognize that the signal is on behalf of a debugger attachment request and suspend all other threads in the process. The attached thread then stops itself, waits on an event, and gives control to the debugger, so that the debugger can analyze the user mode machine state of the process which is to be debugged. However, if the process is already hung at the time that the debugger is being attached to it, a thread in the kernel that was sleeping could be the thread that received the signal and became attached to the debugger. If this happens, the sleeping thread is awakened by the debugger signal, and as a result, the reason for the hang is lost. This is because the "hung" state of the process was disturbed by letting the process handle the signal. Therefore, when the debugger that now has control of the process continues to operate the process, process execution is found to be normal, and the hang condition has been lost. The state of the process which caused the hang condition was changed or affected by the procedure of attaching the debugger to the application process.

BRIEF SUMMARY OF THE INVENTION

Embodiments of the invention are associated with an application process that comprises multiple threads, wherein threads of the process are disposed to run on a data processing system, and each thread can have a user mode or a kernel mode machine state, or both, selectively, when it is running. An embodiment directed to a method comprises the steps of allocating a specified memory location for each of the threads, and responsive to a given thread entering a sleep state, selectively saving the kernel mode machine state of the given thread in the specified memory location for the given thread. The saved machine state comprises the state of the given thread immediately prior to the given thread entering the sleep state. This saved state is duplicated during the debugger attachment process as part of the attachment mechanism, in the specified memory location allocated per thread as described above. This duplication is needed if the debugger attachment interrupts a thread and resumes its execution, because the saved state is lost as well as the reason for the hang. In response to detecting a hang condition in the operation of the process, a debugger is attached to the process to access at least one of the saved user mode machine states. The method further includes analyzing information provided by the at least one accessed machine state to determine the cause of the hang condition. Also, the saved state is restored when the debugger detaches from the process, so that the process is left undisturbed in kernel mode by the attach/detach procedure. This overcomes the present situation, wherein at least one thread in the target process gets interrupted, which affects the process whether or not it was hung.

As used herein, the terms "user mode machine state" and "kernel mode machine state" are respectively defined as follows: Any thread of a multi-threaded application running on a system is said to be running in a user mode machine state until it either makes an operating system call service or gets interrupted by an external interrupt. While being serviced by the operating system or handling the external interrupt the CPU is said to be running in a kernel mode machine state, which is a privileged mode of execution. The user mode machine state will be saved by the operating system when the thread leaves the user mode execution. Upon returning from completing the system call service or interrupt routine, the saved state will be restored so that the thread can resume its execution in user mode where it left off.

DETAILED DESCRIPTION OF THE INVENTION

Figure 1:
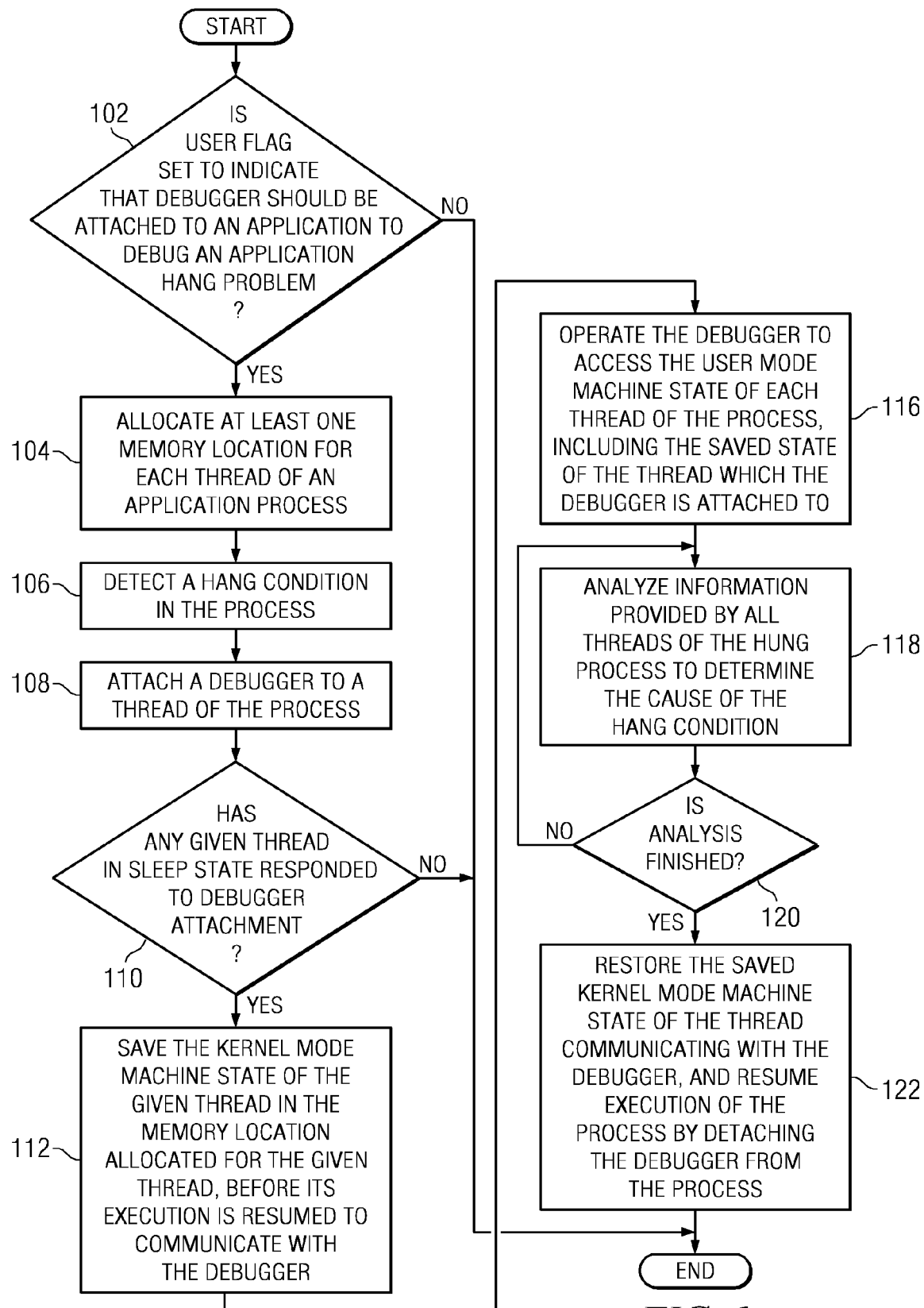
FIG. 1 is a flowchart showing steps for a method comprising an embodiment of the invention.

As will be appreciated by one skilled in the art, the present invention may be embodied as a system, method or computer program product. Accordingly, the present invention may take the form of an entirely hardware embodiment or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including, but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to a flowchart illustration and block diagrams according to embodiments of the invention. It will be understood that each block of the flowchart illustration and/or block diagram, and combinations of blocks in the flowchart illustration and/or block diagram, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

When an application process that has multiple threads is being run, on a computer or data processing system or the like, a hang condition can occur in the process for a number of reasons. For instance, a particular one of the threads could be holding a global or shared resource that is needed by other threads, at a time when a particular thread enters a sleep state. As a result, the particular thread does not release the shared resource, so that it can be made available to other threads when they need it. Accordingly, a hang condition occurs.

As another instance, a first thread could be required to notify a second thread of an event, as the process of the application is being carried out. However, the second thread would not receive notice of the event, if the first thread went into a sleep state before providing such notice. Again, a hang condition could occur.

It is to be appreciated that each thread in the process has an associated state. When the process is carrying out successive instructions, each thread can have one or more values associated with it, such as a value that is to be delivered to a floating point register (FPR) and/or a value that has been received from an FPR. Such set of values of a thread, at a particular time during the execution of the process, is the state of the thread at that time. Such state is also referred to as the machine state or user/kernel state of the thread.

As described above, the state of the sleeping thread can become lost, if the debugger attaches to the thread in an effort to determine the reason for a hang condition. Accordingly, embodiments of the invention are provided to save the state of the sleeping thread that is awoken by the debugger signal, during debugger attachment.

Referring to FIG. 1, there are shown steps for a method comprising an embodiment of the invention. As a preliminary step 102, it is determined whether or not a user flag has been set, to indicate that a debugger should be attached to an application process to delay an application hang problem. The flag may have been set, for example, by a user that had previously noted the occurrence of a hang condition in the process. If the query of step 102 is negative the method of FIG. 1 ends. Otherwise, the method proceeds to step 104.

At step 104, memory locations are allocated, for respective threads of the application process. Preferably, respective locations are located in the memory space of a kernel associated with the process.

At step 106, the process is detected to be in a hang condition. Accordingly, the method of FIG. 1 proceeds to step 108, which shows attachment of a debugger to a thread of the process. This enables the debugger to establish control of the process.

After the debugger has attached to the process, it is important that a duplicate of the kernel mode machine state of an attached thread is saved, before execution of the thread is resumed by the debugger signal. After the debugger attachment, the user of the debugger is then allowed to analyze the user state of the threads in the attached process. As described above, the user mode machine state of a thread is saved whenever the thread leaves user mode execution. This can occur when the thread makes an operating system call service or is interrupted by an external interrupt, such as attachment by the debugger. The saved user mode machine state of a thread is thus available for analysis.

At step 110 it is determined whether or not any given thread in a sleep state has responded to a debugger attachment. This invention also expects that this thread that sleeps in the kernel is interruptible, as there are situations where threads could sleep in the kernel in a non-interruptible fashion and could not be awakened by signals. If not, the method of FIG. 1 ends. Otherwise, as shown by step 112, the machine kernel mode state of each given thread is saved in the memory location allocated for the given thread, before execution of the thread is resumed to communicate with the debugger. The state save procedure could optionally be enabled by means of a tunable loader, which is code used to load an application for processing.

At step 116, the debugger is operated to access the user mode state of each thread of the process, including the user mode state of the thread that the debugger has attached to. At step 118, the accessed machine states are analyzed, in order to determine the cause of the hang condition.

Step 120 determines whether or not the analysis of step 118 is finished. If not, the method returns to step 118. Otherwise, the method proceeds to step 122.

Before the debugger detaches from the process, the saved kernel mode machine state of the thread communicating with the debugger should be used to restore the state of such thread to its state prior to debugger attachment. This is accomplished at step 122. Execution of the process is then resumed, by detaching the debugger from the process. By restoring a thread to its prior state, including a prior sleep state, the process is returned to its original state, as if debugger attachment had never happened.

Figure 2:
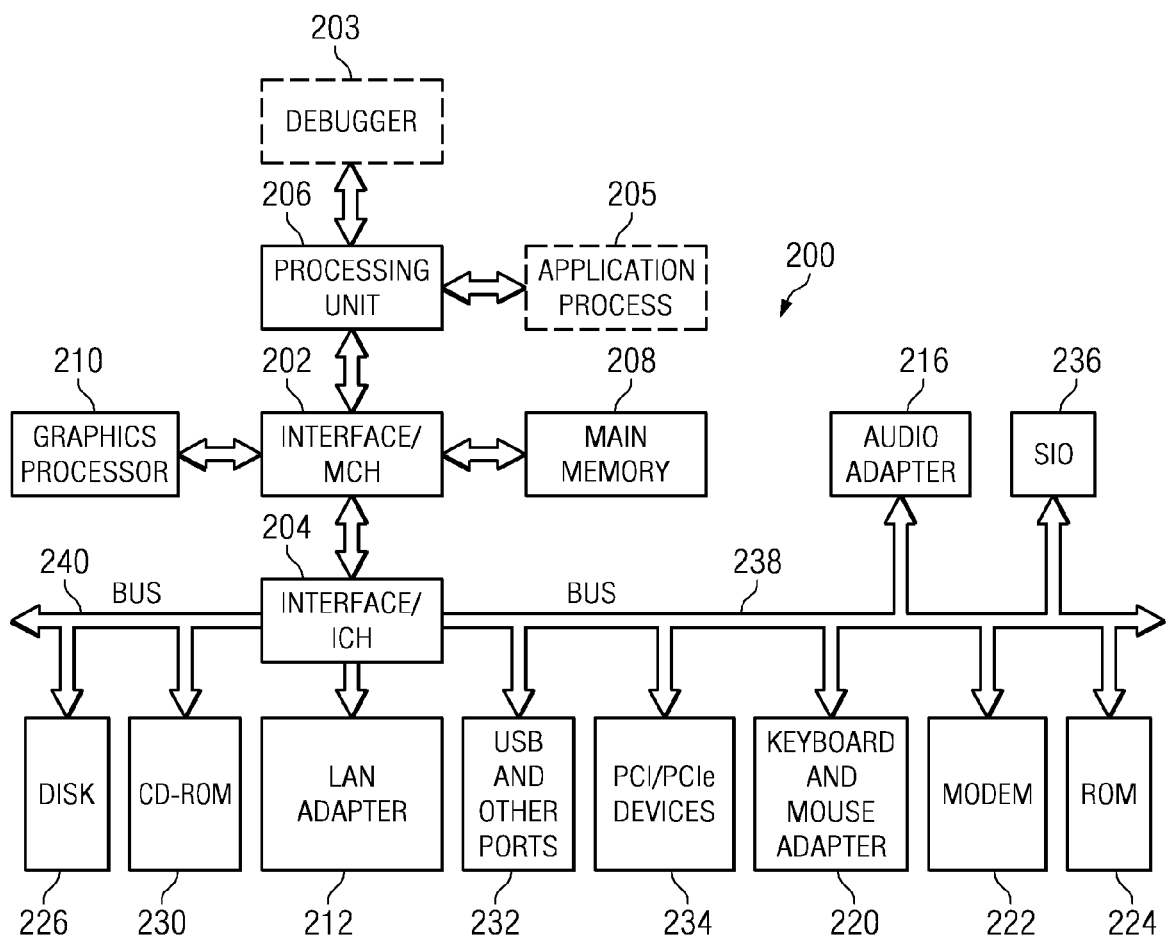
FIG. 2 is a block diagram showing a data processing system which may be used in implementing embodiments of the invention.

Referring to FIG. 2, a block diagram of a data processing system is shown in which aspects of the present invention may be implemented. Data processing system 200 is an example of a computer, in which computer usable code or instructions implementing the processes for embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for embodiments of the present invention are performed by processing unit 206 using computer usable program code, which may be located in a memory such as, for example, main memory 208, ROM 224, or in one or more peripheral devices 226 and 230. For example, processing unit 206 could operate a debugger 203, and could also process respective threads of a process 205 and their saved states, as described herein.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course, the bus system may be implemented using any type of communication fabric or architecture that provides for a transfer of data between different components or devices attached to the fabric or architecture. A communication unit may include one or more devices used to transmit and receive data, such as modem 222 or network adapter 212 of FIG. 2. A memory may be, for example, main memory 208, ROM 224, or a cache such as found in NB/MCH 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. In association with an application process that comprises multiple threads, wherein threads of the process are disposed to run on a data processing system, and each thread can have a user mode machine state or a kernel mode machine state, or both, selectively, when the thread is running, a method comprising the steps of:

allocating a specified memory location for each of said threads;

responsive to a given thread entering a kernel mode machine state, selectively saving the user mode machine state of the given thread, wherein said saved user mode machine state comprises the state of the given thread immediately prior to the given thread entering the kernel mode machine state;

responsive to the given thread entering a sleep state, selectively saving the kernel mode machine state of the given thread in the specified memory location for the given thread, wherein said saved kernel mode machine state comprises the state of the given thread immediately prior to the given thread entering the sleep state;

responsive to detecting a hang condition in the operation of said process, attaching a debugger to said process to access at least said saved user mode machine states;

responsive to attaching said debugger, duplicating said saved kernel mode machine state in the specified location, and saving said duplicated kernel mode machine state;

analyzing information provided at least by said accessed user mode machine state to determine the cause of said hang condition; and after determining the cause of said hang condition, restoring the state of said given thread to said saved kernel mode machine state, and resuming execution of said application process.

2. The method of claim 1, wherein: said step of analyzing information includes analyzing the user mode state of each thread of said process.

3. The method of claim 2, wherein:
   a tunable loader is used to enable said process to save the machine state of each thread that enters a sleep state.

4. The method of claim 1, wherein:
   a particular thread receiving a debugger signal is awoken from a sleep state by said debugger signal.

5. The method of claim 1, wherein:
   each of said specified memory locations are allocated in a kernel memory that is associated with said process.

6. In association with an application process that comprises multiple threads, wherein threads of the process are disclosed to run on a data processing system, and each thread can have a user mode machine state or a kernel mode machine state, or both, selectively, when the thread is running, a computer program product stored in a non-transitory computer readable medium comprising:
   instructions for allocating a specified memory location for each of said threads;
   instructions responsive to a given thread entering a kernel mode machine state, for selectively saving the user mode machine state of the given thread, wherein said saved user mode machine state comprises the state of the given thread immediately prior to the given thread entering the kernel mode machine state;
   instructions responsive to the given thread entering a sleep state, for selectively saving the kernel mode machine state of the given thread in the specified memory location for the given thread, wherein said saved machine state comprises the state of the given thread immediately prior to the given thread entering the sleep state;
   instructions responsive to detecting a hang condition in the operation of said process, for attaching a debugger to said process to access at least said saved user mode machine state;
   instructions responsive to attaching said debugger, for duplicating said saved kernel mode machine state in the specified location, and saving said duplicated kernel mode machine state;
   instructions for analyzing information provided at least by said accessed user mode machine state to determine the cause of said hang condition; and
   instructions responsive to determining the cause of said hang condition, for restoring the state of said given thread to said saved kernel mode machine state, and resuming execution of said application process.

* * * * *